United States Patent
Wu et al.

(10) Patent No.: US 10,692,435 B2
(45) Date of Patent: Jun. 23, 2020

(54) PIXEL DRIVING STRUCTURE AND DISPLAY APPARATUS

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Yu Wu, Guangdong (CN); Lei Wang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 276 days.

(21) Appl. No.: 15/743,052

(22) PCT Filed: Nov. 23, 2017

(86) PCT No.: PCT/CN2017/112607
§ 371 (c)(1),
(2) Date: Jan. 9, 2018

(87) PCT Pub. No.: WO2019/090843
PCT Pub. Date: May 16, 2019

(65) Prior Publication Data
US 2019/0385526 A1    Dec. 19, 2019

(30) Foreign Application Priority Data

Nov. 7, 2017 (CN) .......................... 2017 1 1088250

(51) Int. Cl.
*G09G 3/3258* (2016.01)
*G09G 3/36* (2006.01)

(52) U.S. Cl.
CPC ......... *G09G 3/3258* (2013.01); *G09G 3/3677* (2013.01); *G09G 3/3688* (2013.01);
(Continued)

(58) Field of Classification Search
CPC ......... G09G 3/3614; G09G 2310/0297; G09G 2310/0248
See application file for complete search history.

(56) References Cited

U.S. PATENT DOCUMENTS

2007/0040764 A1*  2/2007  Kim .................. G09G 3/3291
                                                    345/30
2012/0162165 A1*  6/2012  Lee .................. G09G 3/006
                                                    345/206

* cited by examiner

*Primary Examiner* — Gerald Johnson
(74) *Attorney, Agent, or Firm* — Hemisphere Law, PLLC; Zhigang Ma

(57) ABSTRACT

The present application provides a pixel driving structure and a display apparatus, the pixel driving structure including: pixel units; scan lines for outputting scan signals; data lines for outputting data signals; a gate driver for providing the scan signals; a source driver for providing the data signals; a timing controller for providing timing signals; and switches disposed between adjacent data lines, the timing controller is to control the switches to be turned on or turned off. By the above manner, the present application can reduce the voltage drop of the light and dark switching of the pixel to be driven by the source driver, so as to reduce the power consumption of the driving circuit, and solve the problem that the temperature of the source driver is too high in the high loading image.

11 Claims, 3 Drawing Sheets

(52) U.S. Cl.
CPC .............. *G09G 2300/0823* (2013.01); *G09G 2310/0278* (2013.01); *G09G 2330/021* (2013.01)

PIXEL DRIVING STRUCTURE AND DISPLAY APPARATUS

RELATED APPLICATIONS

The present application is a National Phase of International Application Number PCT/CN2017/112607, filed Nov. 23, 2017, and claims the priority of China Application 201711088250.5, filed Nov. 7, 2017.

FIELD OF THE DISCLOSURE

The disclosure relates to a display technology field, and more particularly to a pixel driving structure and a display apparatus.

BACKGROUND

In the liquid crystal display apparatus, the driving voltage applied to the liquid crystal molecules must be inverted at regular intervals, to avoid permanent damage caused by the polarization of the liquid crystal material, and also to avoid the image residual effect. Therefore, a variety of polarity inversion methods have been proposed, including frame inversion, row inversion, column inversion, and dot inversion.

As shown in FIG. 1 and FIG. 2, in the column inversion method, when a high loading image with a light/dark interval (H/L) of a pixel units is occurred, data lines need to be switched between light and dark voltages of the pixel units, the driving circuit needs to reduce the voltage of data lines in the odd number of columns from V1 to V3, rise the voltage of data lines in the even number of columns from V2 to V3, the voltage difference is larger, the power consumption of the source driver becomes larger, and the heat becomes larger; if the heat-dissipation measure is not good, the temperature will slowly increase, thus affecting product quality and reliability.

SUMMARY

The technical problem to be solved in the present application is to provide a pixel driving structure and a display apparatus to reduce the voltage drop of the light and dark switching of the pixel units driven by the driving circuit, thereby reducing the power consumption of the driving circuit, and solving the problem that the temperature of the source driver is too high under the high loading.

In order to solve the above technical problem, one technical solution adopted by the present application is:

A pixel driving structure, including:

Pixel units;

Scan lines, configured for outputting scan signals to the pixel units;

A plurality of data lines in odd number of columns and a plurality of data lines in even number of columns, configured for outputting data signals to the pixel units;

A gate driver connected to the pixel units through the scan lines, configured for providing the scan signals;

A source driver connected to the pixel units through the plurality of data lines in odd number of columns and the plurality of data lines in even number of columns, configured for providing the data signals to form positive and negative driving polarities;

A timing controller connected to the gate driver and the source driver, configured for providing timing signals to the gate driver and the source driver;

Switches disposed between each of the data lines in odd number of columns and adjacent data lines in even number of columns, wherein each of the switches includes: a control terminal, a first terminal, and a second terminal, the control terminal of the switches is connected to the timing controller to control the switches to be turned on or turned off by the timing controller, the first terminal of the switches is connected to the data line in odd number of columns, and the second terminal of the switches is connected to the data line in even number of columns;

The driving polarities of the pixel units connected to the data line in odd number of columns and the pixel units connected to the adjacent data line in even number of columns opposite to each other; and The switches disposed at one side of the data lines in odd number of columns and the adjacent data lines in even number of columns away from the source driver.

In order to solve the above technical problem, another technical solution adopted by the present application is:

Providing a pixel driving structure, including:

Pixel units;

Scan lines, configured for outputting scan signals to the pixel units;

A plurality of data lines in odd number of columns and a plurality of data lines in even number of columns, configured for outputting data signals to the pixel units;

A gate driver connected to the pixel units through the scan lines, configured for providing the scan signals;

A source driver connected to the pixel units through the plurality of data lines in odd number of columns and the plurality of data lines in even number of columns, configured for providing the data signals to form positive and negative driving polarities;

A timing controller connected to the gate driver and the source driver, configured for providing timing signals to the gate driver and the source driver; and Switches disposed between each of the data lines in odd number of columns and adjacent data lines in even number of columns, wherein each of the switches includes: a control terminal, a first terminal, and a second terminal, the control terminal of the switches is connected to the timing controller to control the switches to be turned on or turned off by the timing controller, the first terminal of the switches is connected to the data line in odd number of columns, and the second terminal of the switches is connected to the data line in even number of columns.

In order to solve the above technical problem, another technical solution adopted by the present application is:

Providing a display apparatus including a pixel driving structure, wherein the pixel driving structure, includes:

Pixel units;

Scan lines, configured for outputting scan signals to the pixel units;

A plurality of data lines in odd number of columns and a plurality of data lines in even number of columns, configured for outputting data signals to the pixel units;

A gate driver connected to the pixel units through the scan lines, configured for providing the scan signals;

A source driver connected to the pixel units through the plurality of data lines in odd number of columns and the plurality of data lines in even number of columns, configured for providing the data signals to form positive and negative driving polarities;

A timing controller connected to the gate driver and the source driver, configured for providing timing signals to the gate driver and the source driver;

Switches disposed between each of the data lines in odd number of columns and adjacent data lines in even number of columns, wherein each of the switches includes: a control terminal, a first terminal, and a second terminal, the control terminal of the switches is connected to the timing controller to control the switches to be turned on or turned off by the timing controller, the first terminal of the switches is connected to the data line in odd number of columns, and the second terminal of the switches is connected to the data line in even number of columns.

The advantages of the present application are as follows: different from the conventional technology, in the present application, switches are provided between every data line in odd number of columns and the adjacent data line in even number of columns, the switches are controlled to be turned on or turned off by the timing controller, to reduce the voltage drop of the light and dark switching of the pixel to be driven by the source driver, so as to reduce the power consumption of the driving circuit, and solve the problem that the temperature of the source driver is too high in the high loading image.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the FIGS.

DETAILED DESCRIPTION OF PREFERRED EMBODIMENTS

The technical solutions in the embodiments of the present invention are clearly and completely described below with reference to the accompanying drawings in the embodiments of the present invention. Obviously, the described embodiments are only some embodiments of the present invention, rather than all of the embodiments. All other embodiments obtained by persons of ordinary skill in the art based on the embodiments of the present invention without creative efforts shall fall within the protection scope of the present invention.

The present invention will be described in detail below with reference to the accompanying drawings and embodiments.

Figure 3:
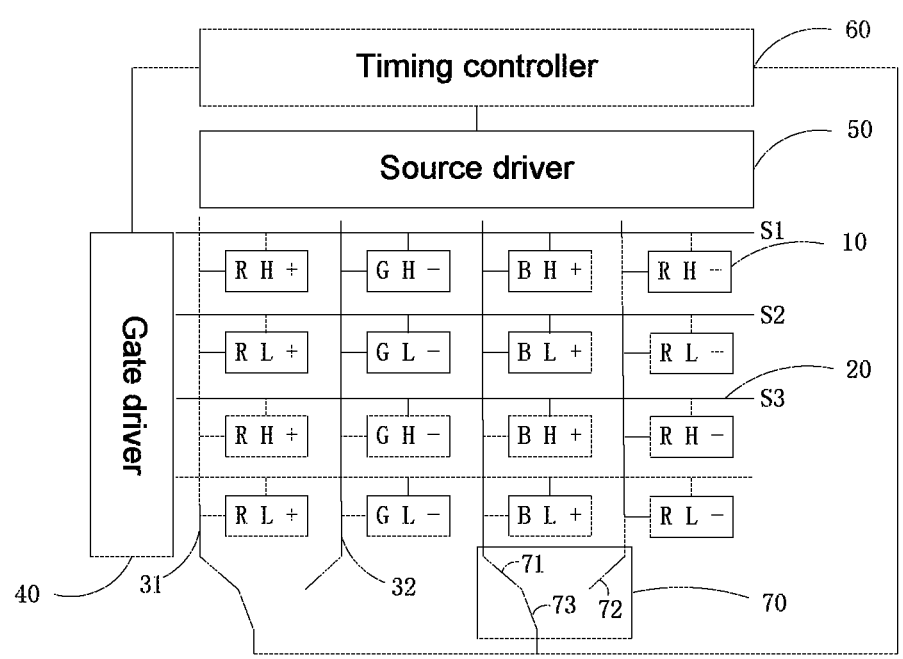
FIG. 3 is a schematic diagram of the pixel driving structure of the present application.

Please refer to FIG. 3, FIG. 3 is a schematic diagram of the pixel driving structure of the present application. The pixel driving structure includes:

Pixel units 10;

Scan lines 20 configured for outputting scan signals to the pixel units 10.

A plurality of data lines in odd number of columns 31 and a plurality of data lines in even number of columns 32 configured for outputting data signals to the pixel units 10;

A gate driver 40 connected to the pixel units 10 through the scan lines 20, and configured for providing the scan signals;

A source driver 50 connected to the pixel units 10 through the plurality of data lines in odd number of columns 31 and the plurality of data lines in even number of columns 32, configured for providing the data signals to form positive and negative driving polarities;

A timing controller 60 connected to the gate driver 40 and the source driver 50, and configured for providing timing signals to the gate driver 40 and the source driver 50;

Switches 70 are disposed between each of the data lines in odd number of columns 31 and the data lines in even number of columns 32. Each of the switches 70 includes: a first terminal 71, a second terminal 72 and a control terminal 73. The control terminal 73 of the switches 70 are connected to the timing controller 60 to control the switches 70 to be turned on or turned off by the timing controller 60. The first terminal 71 of the switches 70 are connected to the data lines in odd number of columns 31, and the second terminal 72 of the switches 70 are connected to the data lines in even number of columns 32;

Specifically, the driving polarities of the pixel units 10 connected to the data lines in odd number of columns 31 and the pixel units 10 connected to the adjacent the data lines in even number of columns 32 are opposite to each other.

In the column inversion method, the driving polarities of the data lines in odd number of columns 31 and the data lines in even number of columns 32 are opposite to each other. For example, in one frame, the driving polarity of the data lines in odd number of columns 31 is positive, the driving polarity of the data lines in even number of columns 32 is negative, in next frame, the driving polarity of the data lines in odd number of columns 31 is switched to negative, the driving polarity of the data lines in even number of columns 32 is switched to positive voltage, and the driving polarities of the adjacent data lines 30 are opposite to each other. In this embodiment, the switches 70 are disposed at one side of the data lines in odd number of columns 31 and the adjacent data lines in even number of columns 32 away from the source driver 50. In other embodiments, the switches 70 may be disposed at other positions, as long as the switches 70 are connected between one data lines in odd number of column 31 and one data lines in even number of column 32 adjacent to the data lines in odd number of column 31, and not limited to the positional relationship of the switches 70 described in this embodiment.

The operation principle of the pixel driving structure is as follows: when the charge of the pixel units 10 connected to the scan line of a current row 20, for example, a first row of the scan line S1 is completed, and before the charging of the pixel units 10 connected to the scan line of a next row 20, that is a second row of the scan line S2, the timing controller 60 outputs a first control signal to the control terminals 73 of the switches 70, to control the switches 70 to be turned on, that is, the first terminals 71 are connected to the second terminals 72 through the control terminals 73. The voltage of the data lines in odd number of columns 31 changes from the first voltage V1 to a fourth voltage V4, and the voltage of the data lines in even number of columns 32 changes from the second voltage V2 to a fifth voltage V5, then the timing controller 60 outputs a second control signal to the control terminals 73 of the switches 70 to control the switches 70 to be turned off, that is, the first terminals 71 of the switches 70 are disconnected from the second terminals 72 through the control terminals 73. When the source driver 50 charges the pixel units 10 connected to the scan line of a next row 20, the second row of the scan line S2, the voltage of the data lines in odd number of columns 31 changes from the fourth voltage V4 to the third voltage V3, the voltage of the data lines in even number of columns 32 changes from the fifth voltage V5 to the third voltage V3. Before the source driver 50 charges the pixel units 10 connected to the scan line of a next two row 20, such as a third row of the scan line S3, the timing controller 60 outputs the first control signal to the control terminals 73 of the switches 70 to control the switches 70 to be turned on, and the voltage of the data lines in odd number of columns 31 changes from the third voltage V3 to the fourth voltage V4, and voltage of the data lines in even number of columns 32 changes from the third voltage V3 to the fifth voltage V5, then the timing controller 60 outputs the second control signal to the control terminal 73 of the switches 70 to control the switches 70 to be turned off. When the source driver 50 charges the pixel units 10 connected to the scan line of the next two row, the third row of the scan line S3, the voltage of the data lines in odd number of columns 31 changes from the fourth voltage V4 to the first voltage V1, and voltage of the data lines in even number of columns 32 changes from the fifth voltage V5 to the third voltage V3.

Specifically, the absolute value of the difference between the first voltage V1 and the third voltage V3 is the same as the absolute value of the difference between the second voltage V2 and the third voltage V3, the absolute value of the difference between the fourth voltage V4 and the third voltage V3 is the same as the absolute value of the difference between the fifth voltage V5 and the third voltage V3, the first voltage V1 is greater than the fourth voltage V4, the fourth voltage V4 is greater than the third voltage V3.

Figure 1:
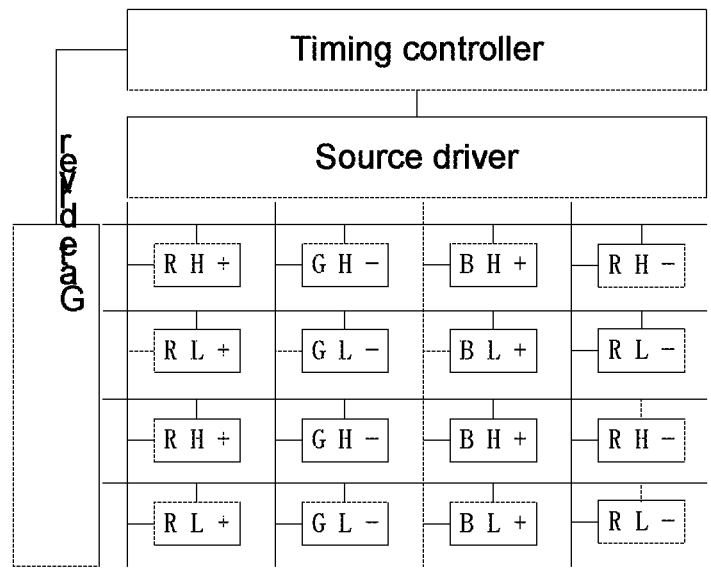
FIG. 1 is a schematic view of a pixel driving structure of the conventional technology.
Figure 2:
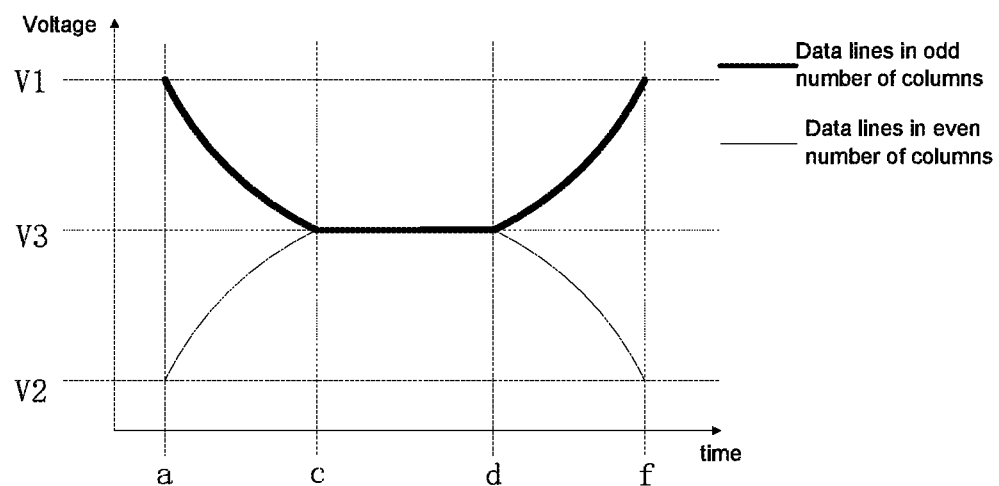
FIG. 2 is a schematic diagram of a change in light and dark switching voltage of the pixel illustrated in FIG. 1.

Please refer to FIG. 2, FIG. 2 is a schematic diagram of a change in light and dark switching voltage of the current pixel driving structure. Wherein;

V1: the first voltage, a charging voltage of the data lines in odd number of columns, the pixel units completing charge are in a light state and the voltage is V1;

V2: the second voltage, a charging voltage of the data lines in even number of columns, the pixel units completing charge are in the light state and the voltage is V2:

V3: the third voltage, the voltage of the pixel units in the dark state;

As can be seen from FIG. 2, from a to c in the curve: the pixel units change from the light state to the dark state.

The source driver drives the voltage of the pixel units connected to the data lines in odd number of columns from the first voltage V1 to the third voltage V3;

The source driver drives the voltage of the pixel units connected to the data lines in even number of columns from the second voltage V2 to the third voltage V3;

From c to d in the curve: the charging of the pixel units are completed, the voltage is maintained at the third voltage V3 for a period of time;

From c to d in the curve: the pixel units change from the dark state to the light state;

The source driver drives the voltage of the pixel units connected to the data lines in odd number of columns from the third voltage V3 to the first voltage V1;

The source driver drives the voltage of the pixel units connected to the data lines in even number of columns from the third voltage V3 to the second voltage V2;

Therefore, it can be seen from FIG. 2, in the pixel driving structure of the conventional technology, when the high loading image with light and dark intervals of pixel units is appeared, the data lines need to be switched between light and dark voltages of the pixel units, the driving circuit needs to reduce the voltage of data lines in the odd number of columns from V1 to V3 directly, rise the voltage of data lines in the even number of columns from V2 to V3, the voltage difference is larger, the power consumption of the source driver becomes larger, and the heat becomes larger; if the heat-dissipation measure is not good, the temperature will slowly increase, thus affecting product quality and reliability.

Figure 4:
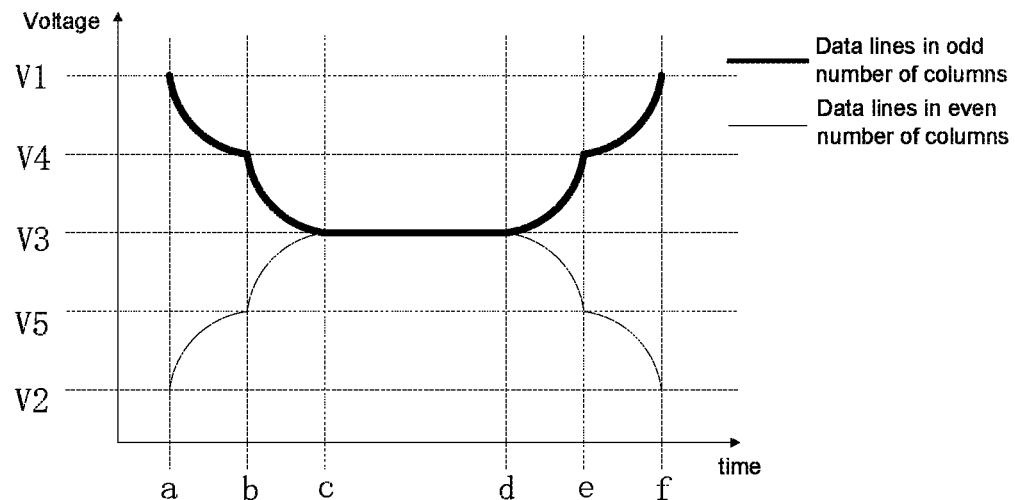
FIG. 4 is a schematic diagram of a change in light and dark switching voltage of the pixel of FIG. 3.

Please refer to FIG. 4, FIG. 4 is a schematic diagram of a change in light and dark switching voltage of the pixel of FIG. 3.

Wherein, it can be seen from FIG. 4, from a to b in the curve: the pixel units 10 changes from a light state to a transition state.

The switches 70 disposed between the data lines 30 are controlled by the timing controller 60 to be turned on. That is, the first terminals 71 of the switches 70 are connected to the second terminals 72 through the control terminals 73. The first voltage V1 and the second voltage V2 are neutralized.

In the moment of the switches 70 turning on, the data lines in odd number of columns 31 are changed from the first voltage V1 to the fourth voltage V4 of the transition state, to charge the corresponding connected pixel units 10 to the fourth voltage V4; the data lines in even number of columns 32 are changed from the second voltage V2 to the fifth voltage V5, to charge the corresponding connected pixel units 10 to the fifth voltage V5;

The switches 70 disposed between the data lines 30 are controlled by the timing controller 60 to turn off, that is, the first terminals 71 of the switches 70 are disconnected from the second terminals 72 through the control terminals 73.

From b to c in the curve: the pixel units 10 changes from the transitional state to the dark state.

The source driver 50 drives the voltage of the pixel units 10 connected to the data lines in odd number of columns 31 from the fourth voltage V4 to the third voltage V3;

The source driver 50 drives the voltage of the pixel units 10 connected to the data lines in even number of columns 32 from the fifth voltage V5 to the third voltage V3;

From d to e in the curve: the pixel units 10 changes from the dark state to the transitional state.

The switches 70 disposed between the data lines 30 are controlled by the timing controller 60 to be turned on. The first voltage V1 and the second voltage V2 are neutralized.

The data lines in odd number of columns 31 are changed from the third voltage V2 to the fourth voltage V4, to charge the corresponding connected pixel units 10 to the fourth voltage V4; the data lines in even number of columns 32 are changed from the third voltage V3 to the fifth voltage V5, to charge the corresponding connected pixel units 10 to the fifth voltage V5;

Then, the switches 70 disposed between the data lines 30 are controlled to be turned off by the control of the timing controller 60.

From e to f in the curve: the pixel units 10 changes from the transitional state to the light state.

The source driver 50 drives the voltage of the pixel units 10 connected to the data lines in odd number of columns 31 from the fourth voltage V4 to the first voltage V1;

The source driver 50 drives the voltage of the pixel units 10 connected to the data lines in even number of columns 32 from the fifth voltage V5 to the second voltage V2;

Therefore, it can be seen from FIG. 4, in the pixel driving structure of the present application, when the high loading image with light and dark intervals of pixel units is appeared, the data lines 30 need to be switched between light and dark voltages of the pixel units 10, the driving circuit reduce the voltage of data lines in the odd number of columns 31 from V1 to V4, and further reduce from V4 to V3, and to rise the voltage of data lines in the even number of columns from V2 to V5, and further rise from V5 to V3, in this way, the variation of the voltage difference is small by the intermediate value, so as to reduce the voltage drop of the pixel units 10 for the light and dark switching need to be driven by the driving circuit, so as to reduce the power consumption of the driving circuit, and solve the problem that the temperature of the source driver 50 is too high in the high loading image, thereby enhancing product quality and reliability.

Figure 5:
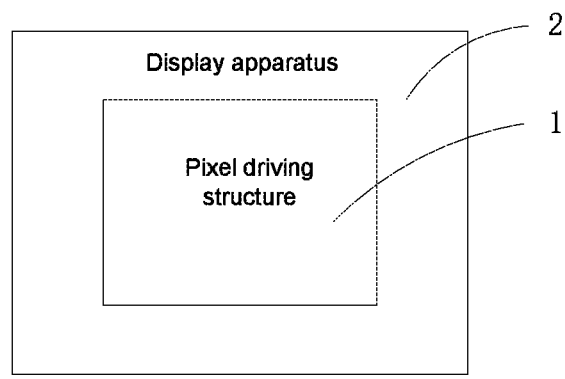
FIG. 5 is a schematic diagram of the display apparatus of the present application.

Please refer to FIG. 5, FIG. 5 is a schematic diagram of the display apparatus of the present application. The display apparatus 2 includes the pixel driving structure 1, the display apparatus 2 may be an LCD or an OLED. The other devices and functions of the display apparatus 2 are the same as the devices and functions of the conventional display apparatus, and are not described herein again.

In the application, switches are set between adjacent data lines, the switches are controlled to be turned on or turned off by the timing controller, to obtain the transition state voltage by the voltage neutralization, so that an intermediate transition state is generated during the light and dark switching of the pixel units, and then the source driver drives the voltage of the data lines to be changed, realizing the pixel units changed from the transition state to the light/dark state. In the above manner, the present application can reduce the voltage drop of the light and dark switching of the pixel to be driven by the source driver, so as to reduce the power consumption of the driving circuit, and solve the problem that the temperature of the source driver is too high in the high loading image.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A pixel driving structure, comprising:
pixel units;
scan lines, configured for outputting scan signals to the pixel units;
a plurality of data lines in odd number of columns and a plurality of data lines in even number of columns, configured for outputting data signals to the pixel units;
a gate driver connected to the pixel units through the scan lines, configured for providing the scan signals;
a source driver connected to the pixel units through the plurality of data lines in odd number of columns and the plurality of data lines in even number of columns, configured for providing the data signals to form positive and negative driving polarities;
a timing controller connected to the gate driver and the source driver, configured for providing timing signals to the gate driver and the source driver;
switches disposed between each of the data lines in odd number of columns and adjacent data lines in even number of columns, wherein each one of the switches comprises: a control terminal, a first terminal, and a second terminal, the control terminal of each one of the switches is connected to the timing controller to control the switches to be turned on or turned off by the timing controller, the first terminal of each one of the switches is connected to one of the data line in odd number of columns, and the second terminal of each one of the switches is connected to one of the data line in even number of columns which adjacent the one of the data line in odd number of columns;
the driving polarities of the pixel units connected to the data line in odd number of columns and the pixel units connected to the adjacent data line in even number of columns opposite to each other; and
the switches disposed at one side of the data lines in odd number of columns and the adjacent data lines in even number of columns away from the source driver.

2. A pixel driving structure, comprising:
pixel units;
scan lines, configured for outputting scan signals to the pixel units;
a plurality of data lines in odd number of columns and a plurality of data lines in even number of columns, configured for outputting data signals to the pixel units;
a gate driver connected to the pixel units through the scan lines, configured for providing the scan signals;
a source driver connected to the pixel units through the plurality of data lines in odd number of columns and the plurality of data lines in even number of columns, configured for providing the data signals to form positive and negative driving polarities;
a timing controller connected to the gate driver and the source driver, configured for providing timing signals to the gate driver and the source driver; and
switches disposed between each of the data lines in odd number of columns and adjacent data lines in even number of columns, wherein each one of the switches comprises: a control terminal, a first terminal, and a second terminal, the control terminal of each one of the switches is connected to the timing controller to control the switches to be turned on or turned off by the timing controller, the first terminal of each one of the switches is connected to one of the data line in odd number of columns, and the second terminal of each one of the switches is connected to one of the data line in even number of columns which adjacent the one of the data line in odd number of columns.

3. The pixel driving structure according to claim 2, wherein the driving polarities of the pixel units connected to the data line in odd number of columns and the pixel units connected to the adjacent data line in even number of columns are opposite to each other.

4. The pixel driving structure according to claim 2, wherein the switches disposed at one side of the data lines in odd number of columns and the adjacent data lines in even number of columns are away from the source driver.

5. The pixel driving structure according to claim 2, wherein when charging of the pixel units connected to the scan line of a current row is completed by the source driver, and before the charging of the pixel units connected to the scan line of a next row, the timing controller controls the switches to be turned on, the voltage of the data lines in odd number of columns changes from a first voltage to a fourth voltage, the voltage of the data lines in even number of columns changes from a second voltage to a fifth voltage, then the timing controller controls the switches to be turned off, when the source driver charges the pixel units connected to the scan line of a next row, the voltage of the data lines in odd number of columns changes from the fourth voltage to the third voltage, the voltage of the data lines in even number of columns changes from the fifth voltage to the third voltage, before the source driver charges the pixel units connected to the scan line of a next two row, the timing controller controls the switches to be turned on, the voltage of the data lines in odd number of column changes from the third voltage to the fourth voltage, the voltage of the data lines in even number of columns changes from the third voltage to the fifth voltage, then the timing controller controls the switches to be turned off, when the source driver charges the pixel units connected to the scan line of the next two row, the voltage of the data lines in odd number of columns changes from the fourth voltage to the first voltage, and voltage of the data lines in even number of columns changes from the fifth voltage to the third voltage.

6. The pixel driving structure according to claim 5, wherein a voltage variation of the data lines in odd number of columns is the same, the voltage variation of the data lines in even number of columns is the same, an absolute value of the difference between the first voltage and the third voltage is the same as the absolute value of the difference between the second voltage and the third voltage, the absolute value of the difference between the fourth voltage and the third voltage is the same as the absolute value of the difference between the fifth voltage and the third voltage, the first voltage is greater than the fourth voltage, the fourth voltage is greater than the third voltage.

7. A display apparatus comprising a pixel driving structure, wherein the pixel driving structure, comprises:
pixel units;
scan lines, configured for outputting scan signals to the pixel units;
a plurality of data lines in odd number of columns and a plurality of data lines in even number of columns, configured for outputting data signals to the pixel units;
a gate driver connected to the pixel units through the scan lines, configured for providing the scan signals;
a source driver connected to the pixel units through the plurality of data lines in odd number of columns and the plurality of data lines in even number of columns, configured for providing the data signals to form positive and negative driving polarities;
a timing controller connected to the gate driver and the source driver, configured for providing timing signals to the gate driver and the source driver;
switches disposed between each of the data lines in odd number of columns and adjacent data lines in even number of columns, wherein each one of the switches comprises: a control terminal, a first terminal, and a second terminal, the control terminal of each one of the switches is connected to the timing controller to control the switches to be turned on or turned off by the timing controller, the first terminal of each one of the switches is connected to one of the data line in odd number of columns, and the second terminal of each one of the switches is connected to one of the data line in even number of columns which adjacent the one of the data line in odd number of columns.

8. The display apparatus according to claim 7, wherein the driving polarities of the pixel units connected to the data line in odd number of columns and the pixel units connected to the adjacent data line in even number of columns are opposite to each other.

9. The display apparatus according to claim 7, wherein the switches are disposed at one side of the data lines in odd number of columns and the adjacent data lines in even number of columns away from the source driver.

10. The display apparatus according to claim 7, wherein when charging of the pixel units connected to the scan line of a current row is completed by the source driver, and before the charging of the pixel units connected to the scan line of a next row, the timing controller controls the switches to be turned on, the voltage of the data lines in odd number of columns changes from a first voltage to a fourth voltage, the voltage of the data lines in even number of columns changes from a second voltage to a fifth voltage, then the timing controller controls the switches to be turned off, when the source driver charges the pixel units connected to the scan line of a next row, the voltage of the data lines in odd number of columns changes from the fourth voltage to the third voltage, the voltage of the data lines in even number of columns changes from the fifth voltage to the third voltage, before the source driver charges the pixel units connected to the scan line of a next two row, the timing controller controls the switches to be turned on, the voltage of the data lines in odd number of column changes from the third voltage to the fourth voltage, the voltage of the data lines in even number of columns changes from the third voltage to the fifth voltage, then the timing controller controls the switches to be turned off, when the source driver charges the pixel units connected to the scan line of the next two row, the voltage of the data lines in odd number of columns changes from the fourth voltage to the first voltage, and voltage of the data lines in even number of columns changes from the fifth voltage to the third voltage.

11. The display apparatus according to claim 10, wherein a voltage variation of the data lines in odd number of columns is the same, the voltage variation of the data lines in even number of columns is the same, an absolute value of the difference between the first voltage and the third voltage is the same as the absolute value of the difference between the second voltage and the third voltage, the absolute value of the difference between the fourth voltage and the third voltage is the same as the absolute value of the difference between the fifth voltage and the third voltage, the first voltage is greater than the fourth voltage, the fourth voltage is greater than the third voltage.

\* \* \* \* \*